United States Patent
Dávila

(10) Patent No.: US 7,095,222 B2
(45) Date of Patent: Aug. 22, 2006

(54) LEAK DETECTION METHOD AND SYSTEM IN NONMETALLIC UNDERGROUND PIPES

(75) Inventor: Vincente González Dávila, Tamps. (MX)

(73) Assignee: Geo Estratos, S.A. de C.V., Ciudad Madero (MX)

( * ) Notice: Subject to any disclaimer, the term of this patent is extended or adjusted under 35 U.S.C. 154(b) by 0 days.

(21) Appl. No.: 11/257,875

(22) Filed: Oct. 25, 2005

(65) Prior Publication Data

US 2006/0091876 A1    May 4, 2006

(30) Foreign Application Priority Data

Nov. 4, 2004  (MX) ................ NL/a/2004/000086

(51) Int. Cl.
*G01N 27/00* (2006.01)
*G01R 27/08* (2006.01)

(52) U.S. Cl. ................... 324/71.1; 324/718
(58) Field of Classification Search ........... 324/71.1, 324/527, 528, 529, 530, 559, 693, 718
See application file for complete search history.

(56) References Cited

U.S. PATENT DOCUMENTS

| | | | |
|---|---|---|---|
| 3,776,032 A | 12/1973 | Vogel | |
| 4,101,827 A | 7/1978 | Offner | |
| 4,114,721 A | 9/1978 | Glenn, Jr. | |
| 5,548,530 A | 8/1996 | Baumoel | |
| 6,051,977 A * | 4/2000 | Masuda et al. | 324/529 |
| 6,442,999 B1 | 9/2002 | Baumoel | |
| 6,530,263 B1 | 3/2003 | Chana | |
| 6,595,038 B1 | 7/2003 | Williams et al. | |
| 6,667,709 B1 * | 12/2003 | Hansen et al. | 342/22 |
| 6,668,619 B1 | 12/2003 | Yang et al. | |

FOREIGN PATENT DOCUMENTS

| | | |
|---|---|---|
| DE | 4017238 A1 * | 12/1991 |
| MX | NL/A/2004/000013 | 2/2004 |
| MX | NL/A/2004/000075 | 9/2004 |

\* cited by examiner

*Primary Examiner*—Anjan Deb
*Assistant Examiner*—Hoai-An D. Nguyen
(74) *Attorney, Agent, or Firm*—Gunn & Lee, P.C.

(57) ABSTRACT

A method for locating leaks in nonmetallic pipes on the principal of measuring and graphing the intensity of electric fields. Leaks are located by creating a closed circuit with a negatively charged metallic electrode submersed in water inside a manhole connected to the nonmetallic pipe and several positively charged metallic electrodes placed in several reference holes in the ground above the nonmetallic pipe. A leak is determined by finding segments of nonmetallic pipe that corresponds with greater electric field intensity measurements.

16 Claims, 2 Drawing Sheets

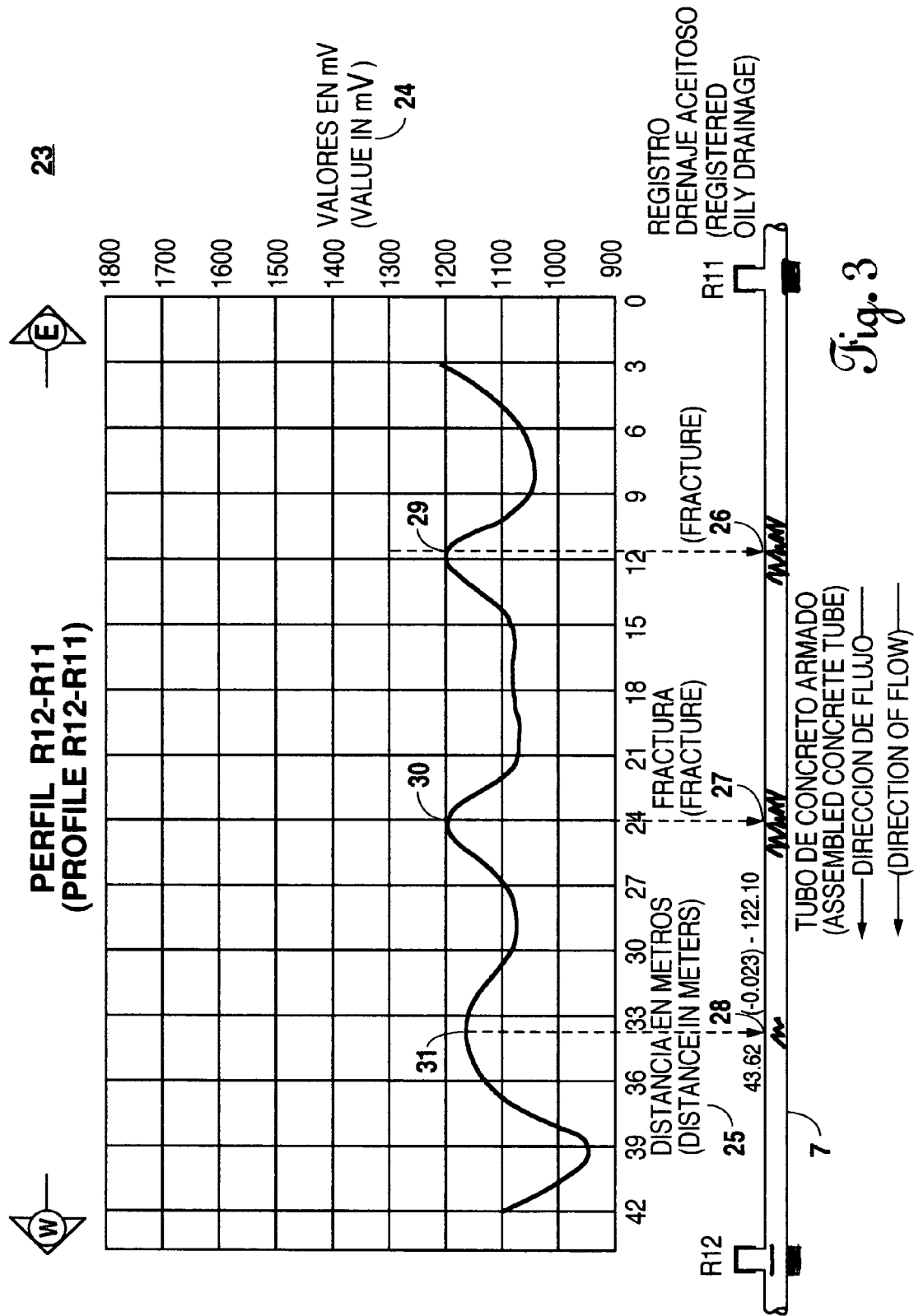

LEAK DETECTION METHOD AND SYSTEM IN NONMETALLIC UNDERGROUND PIPES

BACKGROUND OF THE INVENTION

This is a non-provisional application claiming priority to the Mexican Patent Application, Document Number NL/a/2004/000086, filed on Nov. 4, 2004.

1. Field of the Invention

Applicant's invention relates to the field of leak detection for underground pipes, and more specifically to a method for locating leaks in underground nonmetallic pipes through detection of electric field frequencies within the underground nonmetallic pipes.

2. Background Information

Pipe systems have historically been placed underground to conduct a variety of substances to and from various locations. The pipes that make up these pipe systems have typically been constructed from both metal and nonmetal materials. Inevitably, especially with nonmetallic pipes, breaks and cracks will form in the pipes over time, causing the substances they carry to leak into the surrounding ground and underground water, thereby often contaminating the soil, water, environment and ecosystem surrounding the pipes. These breaks and cracks occur as the pipes are no longer able to resist the forces exerted on them by the surrounding ground environment. The potential mess can be costly, and sometimes impossible to clean up. Furthermore the potential damage to the soil, water and surrounding environment or ecosystem can be irreversible. Thus, it is desirable to have a method for detecting and determining the location of leaks in nonmetallic pipes caused by breaks or cracks in the pipes. The present invention provides a system and method for locating leaks in nonmetallic pipes quickly and efficiently, thereby reducing or even eliminating the potential costly clean up and damage to the environment.

There exists in the prior art several related patents. U.S. Pat. No. 3,776,032 discloses protection of an inflow of either gas or liquid into a well. The detection occurs during the drilling of the well for the prevention of blowouts. The detection process involves the use of pressure mud pulses from a pair of acoustical transducers, which generate signals in the form of pressure waves, both before the drilling mud is circulated to the drill bit and after drilling mud is circulated through the drill bit. The difference, if any, in the two signals are then converted to a signal then transmitted to the surface.

U.S. Pat. No. 4,114,721 discloses a pair of acoustic detectors moving through a well to detect sound which is indicative of a through casing leak, i.e., a leak that goes through the casing. The acoustic noise generated by the noise sources is monitored at two spaced-apart locations within the borehole. The signals, representing the monitored acoustic noise at each location, are transmitted uphole.

U.S. Pat. No. 4,101,827 discloses the detection of leaks in an underground pipe which is made of electrically insulating material, i.e., material that does not conduct electricity. The detection process involves partially filling the pipe with an electrically conductive fluid, such as tap water, passing an electrical current through the fluid to establish a voltage gradient along the length of the fluid in the pipe, and then analyzing the gradient to determine the location of the leak. The voltage source is electronically connected to one electrode which is immersed in the liquid at one pipe end, and to a second electrode which is driven into the ground. The method disclosed in this patent involves inserting a wire inside the underground pipe in order to properly determine the potential drop and the determination of the location of the leak or leaks is done by measuring the length of wire inserted into the underground pipe at the point where there is a potential drop, i.e., the point of minimal voltage.

U.S. Pat. No. 5,548,530 discloses a non-intrusive high-precision ultra-sonic leak detector system for pipelines for identification of the development of even very minute, i.e., millimeter size, leaks and locates them within several meters of their actual location in a segment between two site stations of the overall leak detection. Leaks are located and their locations determined by their effect on the pressure of the pipeline, and the effect of the pressure change on liquid density.

U.S. Pat. No. 6,442,999 discloses the same technology that is disclosed in U.S. Pat. No. 5,548,530 regarding detection of leaks in an underground pipeline system. However, U.S. Pat. No. 6,442,999 adds a master station to which site stations transmit sonic wave data in order to perform calculations to determine the presence of a leak and also their location.

U.S. Pat. No. 6,530,263 discloses a system for finding and locating leaks in a pipeline using loggers positioned along the pipeline at spaced intervals. These loggers detect and store sound data produced within the pipeline and download the stored sound data to a computer system to determine the location of the leaks.

U.S. Pat. No. 6,595,038 discloses an apparatus for determining the position of a leak in an underground pipe for fluid or gas using two acoustic sensors. The first sensor is coupled to the pipe while the second sensor is movable above the pipe. Both sensors detect sound either carried along the walls of the pipe or along fluid in the pipe.

U.S. Pat. No. 6,668,619 discloses a method and apparatus for locating the source of a leak in a pipeline using match pattern filtering techniques. These match pattern filters discriminate against background noise and pressure disturbances generated by other non-leak sources. This method uses acoustic signals to determine whether a leak exists and where it is located.

Finally, U.S. Pat. No. 6,650,125 discloses locating leaks of conductive fluids, such as ionized water, from non-conductive structures, such as pipes, through the use of a charge generator employed to charge and discharge the conductive fluid, and a capacitive type detector that can detect the variable charge that is induced in the fluid. This detector is handheld and portable.

However, the current art does not disclose a system and method for locating leaks in nonmetallic pipes that does not require the insertion of a wire or device into the nonmetallic pipe itself. Furthermore, none of the references disclose a system and method for locating leaks without intrusion into the nonmetallic pipe that is simple, inexpensive and accurate. Therefore, a need exists for a cost-efficient system and method for locating leaks in nonmetallic pipes without requiring intrusion into the pipes.

SUMMARY OF THE INVENTION

It is an object of the present invention to provide a simple system and method of locating leaks.

It is another object of the present invention to provide an accurate leak detection method and system.

It is another object of the present invention to provide a simple system and method of locating leaks in nonmetallic pipes.

It is another object of the present invention to provide a simple system and method of locating leaks in nonmetallic pipes without the intrusion or insertion of complicated sensors or wires into the pipe itself.

It is another object of the present invention to eliminate environmental concerns such as contamination surface or ground water, soil, or the surrounding environment or ecosystem.

It is another object of the present invention to decrease the risk of false positives associated with leak detection methods.

It is another object of the present invention to use an electric field and electrodes for leak determination.

In satisfaction of these related objectives, Applicant's present invention provides a system and method of locating leaks in nonmetallic pipes using identification and measurement of an electric field existing within the pipes.

The present system and method for detecting and determining the location of leaks in nonmetallic pipes employs the concept of measuring the intensity of electric fields. The process generally involves placing two plugs in the nonmetallic pipe such that the portion of the pipe desired to be examined to determine the location of a leak is between the two plugs. Furthermore, a conventional manhole is located at a central or medial point between the plugs and is adjacent to the nonmetallic pipe, and in connecting relationship therewith. The nonmetallic pipe and manhole are filled with an electrically conductive fluid such as water. A negatively charged metallic electrode is placed in the manhole, below the surface of the water, and connected by an electric conductor to an electric field transmitter, which is located on the ground at any desired location. The negatively charged metallic electrode is also connected to an electric field measuring device by electric conductors. It is desirable for the electric field transmitter and electric field measuring device to have a frequency less than 30 hertz (Hz).

A plurality of holes are incrementally dug into the ground above the underground pipe, usually in one meter increments. A corresponding plurality of positively charged electrodes are placed in the holes. The positively charged electrodes are connected to the electric field measuring device by a corresponding plurality of electric conductors, thereby forming a closed circuit.

The electric field transmitter and electric field measuring device can be one of any suitable devices found in the marketplace and commonly used for transmitting electric fields and measuring electric field intensity, respectively. Furthermore, the positive and negative electrodes, electric conductors, electric field transmitter and electric field measuring device described are known in the art and will be recognized by one skilled in the art.

The intensity of the electric field is measured between the positively charged electrode at each hole in the ground and the negatively charged electrode below the surface of the water on the inside of the manhole. These measurements are then graphed such that the position of the holes in the ground are plotted along the "X" or horizontal axis and the intensity of the electric field is plotted along the "Y" or vertical axis. The resulting graph shows the intensity of the electric field at the corresponding holes in the ground. Thus, the segment of nonmetallic pipe that has a leak is discovered by determining corresponding holes in the ground that measure high in electric field intensity.

BRIEF DESCRIPTION OF THE DRAWINGS

FIG. 3 is an actual graphical representation produced during the use of the present invention.

DETAILED DESCRIPTION OF THE PREFERRED EMBODIMENT

Figure 1:
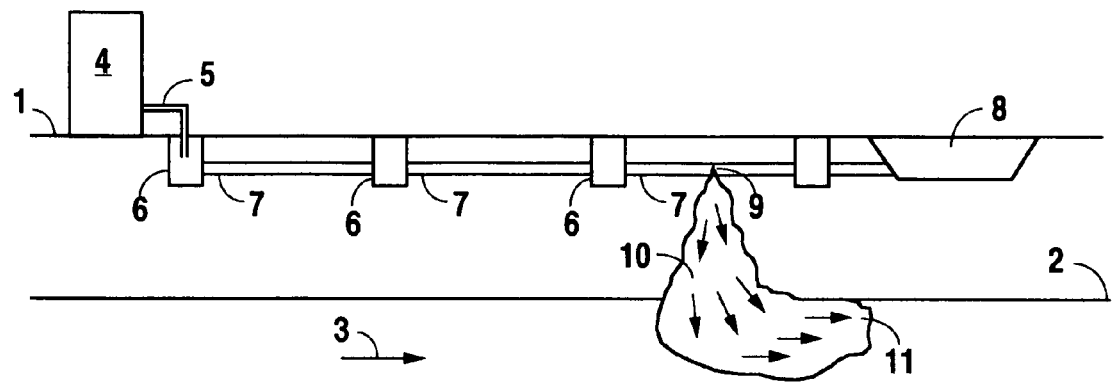
FIG. 1 presents a process that can cause a leak in nonmetallic pipes that conducts water or residual discharge from an industrial installation.

FIG. 1 shows one application of the current invention. An industrial plant 4 conducts water through a residual discharge 5 to a treatment plant 8 through nonmetallic pipe 7 which adjacently intersects and comes in connecting relationship with a plurality of manholes 6. A leak 9 is shown in nonmetallic pipe 7, causing contamination 11 of a filtration zone 10 and the underground water supply 2. The direction of the flow of underground water 3 is also illustrated.

Figure 2:
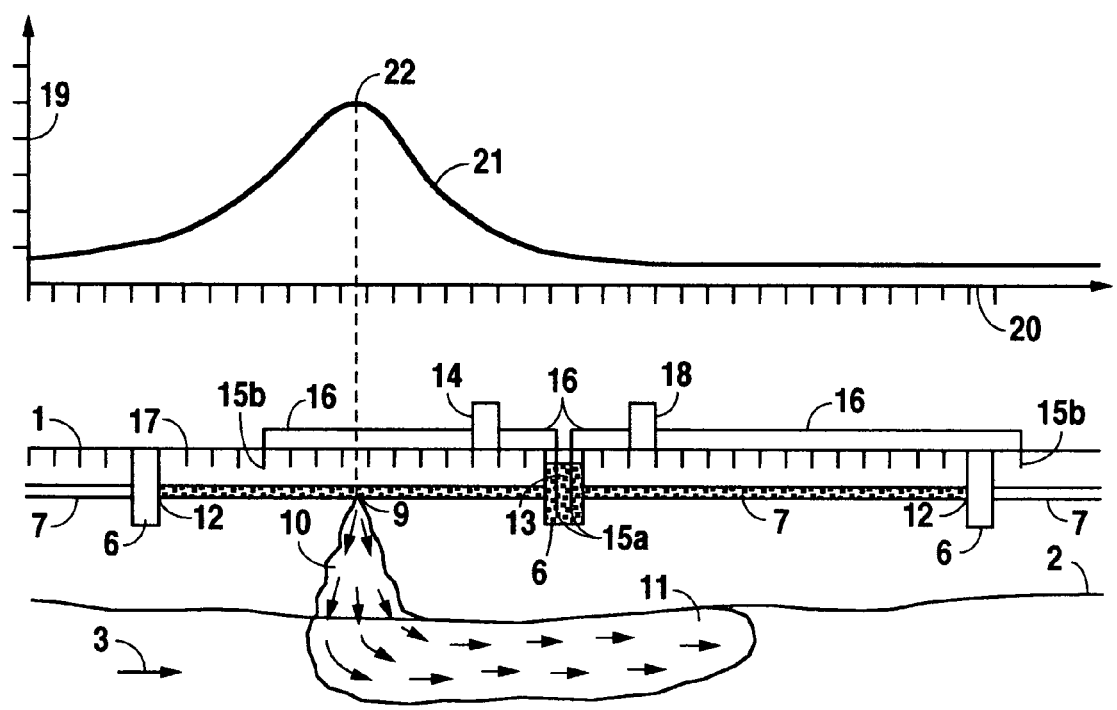
FIG. 2 shows the preferred embodiment of the present invention for the detection of leaks in nonmetallic pipes.

FIG. 2 shows the preferred embodiment of the present invention for determination of the position of leaks 9 in nonmetallic piping 7 joined by at least one concrete manhole 6, causing contamination 11 of the filtration zone 10 and the underground water 2 in the direction of the flow of underground water 3.

At least two plugs 12 are inserted on each end of the nonmetallic pipe 7, defining an area of the nonmetallic pipe 7 that is desired to be tested for leaks 9. The plugs are inserted in the nonmetallic pipe 7 such that a manhole 6 is located at an approximate medial or central area of desired test area of the nonmetallic pipe 7. The nonmetallic pipe 7 is aligned perpendicularly and adjacent to the manhole 6 and is in connecting relationship with the manhole 6. The nonmetallic pipe 7 and the manhole 6 are then filled with water 13. A negatively charged metallic electrode 15a is placed inside the manhole 6 in a position such that the entire negatively charged metallic electrode 15a is submerged in the water 13. The negatively charged metallic electrode 15a is attached to an electric field transmitter 18 by an electric conductor 16. The negatively charged metallic electrode 15a is also connected to an electric field measuring device 14 by an electric conductor 16. The electric field transmitter 18 and electric field measuring device 14 are located on the ground 1 at any desirable location.

It is desirable that the electric field transmitter 18 and the electric field measuring device 14 have a frequency less than 30 hertz (Hz). Moreover, a plurality of electric conductors are referenced in describing the present invention. These electric conductors are all referenced with the number 16 for simplicity. It should be understood that the electric conductors 16 differ only with respect to their position and orientation, namely the electrodes and electric field transmitter or electric field measuring device to which they connect.

A plurality of holes 17 are incrementally dug into the ground over the section of the nonmetallic pipe 7 that is being tested at increments of approximately one meter. These holes 17 provide a reference point to determine the location of a leak in the nonmetallic pipe 7. A corresponding plurality of positively charged metallic electrodes 15b are placed into the plurality of holes 17. A corresponding plurality of electric conductors 16 further connects the positively charged metallic electrodes 15b to the electric field measuring device 14.

The electric field measuring device 14 measures the intensity of the electric field at each positively charged metallic electrode 15b in each hole 17 located over the nonmetallic pipe 7. The intensity of the electric field is measured between the negatively charged metallic electrode 15a inside the manhole 6 and each positively charged metallic electrodes 15b in the holes 17 over the nonmetallic pipe 7.

These measurements are then graphed. The graph, as shown in FIG. 2 consists of a horizontal, or "X" axis 20 and a vertical or "Y" axis 19. The X axis 20 represents the position of each hole 17 over the nonmetallic pipe 7. The Y axis 19 represents the intensity of the electric field as measured by the electric field measuring device 14. The resulting graph shows the electric field intensity as a function of the location of the hole 17 above the nonmetallic pipe 7. By graphing the electric field intensity as a function of the location of the hole 17, the position of the leak is determined by finding the greatest point of intensity of the electric field (22 as shown in FIG. 2), and coordinating that greatest point of intensity 22 with the position of the hole 17 along the X axis 20. In other words, segments of nonmetallic pipe 7 that have leaks are discovered by determining which holes 17 in the ground have high electric field intensities.

Referring now to FIG. 3, this figure depicts an example of an actual graphical representation 23 produced during the use of the present invention. In this graphical representation 23, the Y axis 24 represents the strength of the electric field signal in millivolts (mv) and is labeled accordingly. The X axis 25 represents the distance in meters (m) and again is labeled accordingly. The determined leak points 26, 27 and 28 within the segment of nonmetallic pipe 7 in this example corresponds to the distances of less than twelve meters 29, twenty-four meters 30, and thirty five meters 3, respectively.

Although the invention has been described with reference to the preferred embodiment, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. A method of locating leaks in an underground nonmetallic pipe, said underground nonmetallic pipe being in connecting relationship with a plurality of manholes, said method comprising the steps of:
    locating an underground nonmetallic pipe;
    determining a portion of said underground nonmetallic pipe to be tested for at least one leak;
    installing a leak locating system along said portion of underground nonmetallic pipe to be tested;
    taking at least one measurement of electric field intensity along said portion of nonmetallic pipe to be tested;
    plotting said at least one measurement of electric field intensity onto a graph;
    interpreting said graph; and
    wherein said installing step comprises placing at least two plugs inside said underground nonmetallic pipe at the outer edges of said portion of underground nonmetallic pipe for defining an area of the nonmetallic pipe desired to be tested for leaks and preventing the leaks of a fluid inside the area of the nonmetallic pipe while testing.

2. The method of locating leaks in an underground nonmetallic pipe, as set forth in claim 1, wherein at least one manhole is located approximately in the center of said portion of underground nonmetallic pipe to be tested.

3. The method of locating leaks in an underground nonmetallic pipe, as set forth in claim 2, wherein said installing step further comprises filling said portion of underground nonmetallic pipe to be tested and said at least one manhole with water.

4. The method of locating leaks in an underground nonmetallic pipe, as set forth in claim 3, wherein said installing step further comprises connecting at least one negatively charged metallic electrode to an electric field transmitter and an electric field measuring device with a plurality of electric conductors.

5. The method of locating leaks in an underground nonmetallic pipe, as set forth in claim 4, wherein said installing step further comprises connecting a plurality of positively charged metallic electrodes to said electric field measuring device with a plurality of electric conductors and incrementally placing said plurality of positively charged metallic electrodes in the ground above said portion of nonmetallic pipe to be tested.

6. The method of locating leaks in an underground nonmetallic pipe, as set forth in claim 5, wherein said installing step further comprises placing said at least one negatively charged metallic electrode inside said at least one manhole and submerging said negatively charged metallic electrode in the water.

7. The method of locating leaks in an underground nonmetallic pipe, as set forth in claim 6, wherein said taking at least one measurement step comprises using said electric field measuring device to measure electric field intensity between said plurality of positively charged metallic electrodes and said negatively charged metallic electrodes.

8. A leak locating system for underground nonmetallic pipe, said underground nonmetallic pipe being in connecting relationship with a plurality of manholes and at least one manhole being located approximately in the center of a portion of said underground nonmetallic pipe to be tested, said system comprising:
    at least two plugs placed inside said underground nonmetallic pipe at the outer areas of said portion of underground nonmetallic pipe for defining an area of the nonmetallic pipe desired to be tested for leaks and preventing the leaking of a fluid inside the area of the nonmetallic pipe while testing;
    an electric field transmitter;
    an electric field measuring device; to measure electric field intensity along said portion of nonmetallic pipe to be teste;
    at least one negatively charged metallic electrode;
    a plurality of positively charged metallic electrodes; and
    a plurality of electric conductors.

9. The leak locating system, as set forth in claim 8, wherein said portion of underground nonmetallic pipe to be tested and said at least one manhole are filled with water.

10. The leak locating system, as set forth in claim 9, wherein said at least one negatively charged metallic electrode is connected to said electric field transmitter and said electric field measuring device.

11. The leak locating system, as set forth in claim 10, wherein said plurality of positively charged metallic electrodes are incrementally placed in the ground above said portion of underground nonmetallic pipe to be tested and connected to said electric field measuring device.

12. The leak locating system, as set forth in claim 11, wherein said negatively charged metallic electrode is submerged under water inside at least one manhole.

13. The leak locating system, as set forth in claim 12, wherein said electric field measuring device takes at least one measurement of electric field intensity between said plurality of positively charged metallic electrodes and said at least one negatively charged metallic electrode.

14. The leak locating system, as set forth in claim 13, wherein said at least one measurement is plotted on a graph, and said graph is interpreted.

15. The leak locating system, as set forth in claim 10, wherein a plurality of electric conductors connects said at least one negatively charged metallic electrode to said electric field transmitter and said electric field measuring device.

16. The leak locating system, as set forth in claim 11, wherein a plurality of electric conductors connects said plurality of positively charged metallic electrodes to said at least one negatively charged metallic electrode.

* * * * *